United States Patent [19]

Bassalleck et al.

[11] Patent Number: 5,132,542

[45] Date of Patent: Jul. 21, 1992

[54] DIGITAL GAMMA RAY IMAGING DEVICE

[76] Inventors: Bernd Bassalleck, P.O. Box 918, Edgewood, N. Mex. 87015; Michael F. Hartshorne, 1568 Eagle Ridge Ct. NE., Albuquerque, N. Mex. 87122; Charles A. Kelsey, 3116 Camino Real NE., Albuquerque, N. Mex. 87111; Frederick A. Mettler, 3004 La Mancha NW., Albuquerque, N. Mex. 87104; David M. Wolfe, 2516 Elfego Rd. NW., Albuquerque, N. Mex. 87107

[21] Appl. No.: 652,970

[22] Filed: Feb. 11, 1991

[51] Int. Cl.$^5$ .............................................. G01T 1/164
[52] U.S. Cl. ........................... 250/370.09; 250/363.04; 250/370.06
[58] Field of Search ...................... 250/370.08, 370.09, 250/370.12, 370.13, 370.06, 363.03, 363.04, 363.05, 363.10

[56] References Cited

U.S. PATENT DOCUMENTS

| 4,047,037 | 9/1977 | Schlosser et al. | 250/370.09 |
|---|---|---|---|
| 4,245,158 | 1/1981 | Burstein | 250/370.09 |
| 4,292,645 | 9/1981 | Schlosser et al. | 250/370.09 X |
| 4,571,494 | 2/1986 | Nishiki et al. | |
| 4,651,005 | 3/1987 | Baba et al. | 250/363.10 |
| 4,672,207 | 6/1987 | Derenzo | |
| 4,755,679 | 6/1988 | Wong | 250/363.03 |
| 5,005,195 | 4/1991 | Lanza et al. | 250/370.09 X |

OTHER PUBLICATIONS

McCready et al., "Clinical Test on a Prototype Semiconductor Gamma Camera", British Journal of Radiology, 44, No. 517, pp. 58–62, 1971.

Profio et al., "Semiconductor Camera for Detection of Small Tumors", J. Nucl. Med. vol. 16, No. 1, pp. 53–57, Jan. 1975.

Kaufman et al., "Semiconductor Gamma-Cameras in Nuclear Medicine", IEEE Transactions on Nuclear Science, vol. NS-27, No. 3, Jun. 1980.

Primary Examiner—Constantine Hannaher
Assistant Examiner—Edward J. Glick

[57] ABSTRACT

The arrangement imaging a body through gamma radiation comprising the steps of detecting, within each fixed time period of a succession of fixed time periods at a plurality of locations impinged by the gamma radiation, electric charge levels corresponding to photoelectric events; counting within each fixed period only those charge levels at each location which are greater than a predetermined threshold level, and adding the counted charge levels for the succession of fixed time periods, whereby a distinct image of the body may be produced therefrom.

12 Claims, 2 Drawing Sheets

DIGITAL GAMMA RAY IMAGING DEVICE

BACKGROUND OF THE INVENTION

This invention relates to gamma ray imaging and more particularly to an arrangement for providing enhanced images of bodies through improved processing of detected gamma radiation.

There are many techniques for irradiating bodies such as humans for diagnostic purposes. Typically, these usually involve the use of X radiation, gamma radiation, nuclear magnetic resonance imaging (MRI), or CT scanning. One such arrangement is described in U.S. Pat. No. 4,571,494 which employs an array of detector elements each comprised of semiconductor materials such as Si, Ge, CdTe, HgI$_2$, or GaAs for detecting X or gamma radiation. The semiconductor detecting elements are arranged in an arc. The radiation is constrained to be incident upon the respective detector elements in their lengthwise directions by a collimator, e.g., a radiation absorbing body having holes or slits, interposed between the detector elements and the source of radiation. This orientation enables the detector elements to be essentially equally sensitive to the incoming radiation.

In arrangements such as the foregoing involving semiconductor detectors, the image information is individually read out. In others such as the Anger camera, e.g., see U.S. Pat. No. 4,672,207, the incident, collimated radiation is viewed by a large number of phototubes. The light generated by the conversion of an incident gamma ray into electrons in an NaI crystal is viewed by many of the photo tubes. Because of of the analog nature of the information, in past systems typical spatial resolutions of 5 to 6 mm FWHM are obtained. Resolution as good as about 3 mm FWHM has been reported.

Another problem with the foregoing arrangements is an apparent limit of 10% for energy resolution. This leads to background noise causing blurring of the image. When, as in nuclear medicine, gamma rays are emitted from a source within the body, such rays can undergo Compton scattering as they exit the body. Gamma ray interactions are well known and are discussed, for example, in "High Energy Particles" by Bruno Rossi, Prentice-Hall, 1952. These scattered gamma rays enter a collimator with less energy than their original value. With the available energy resolution capability of the NaI crystal in arrangements such as those referred to above, it is not possible to separate these lower energy scattered gammas from the full energy ones. Since the scattered gammas represent a larger number of photons than the desired ones and thus do not relate or point back to their original position in the body, resolution is limited.

SUMMARY OF THE INVENTION

The present invention provides improved detection efficiency by substantially improving spatial and energy resolution. This is done by essentially eliminating the effects of Compton scattering and limiting signal processing of reactions to only photoelectric events. In effect, photons that do not contribute to the image are eliminated. Consequently, particularly in nuclear medicine, quicker patient scans with reduced radiation doses are afforded. In accordance with the invention, spatial resolutions of 1 mm or better and energy resolutions of about 2% or less are achieved.

In accordance with the invention these improved results are obtained through a simple signal processing arrangement in which image signals are eliminated if they do not reach a threshold level within a predetermined period or clock cycle corresponding to a prescribed photoelectric event such as the energy level for non-scattered gamma radiation.

BRIEF DESCRIPTION OF THE DRAWINGS

Reference is now made to the drawings in which like numerals represent like parts and in which.

DETAILED DESCRIPTION OF THE INVENTION

Figure 1:
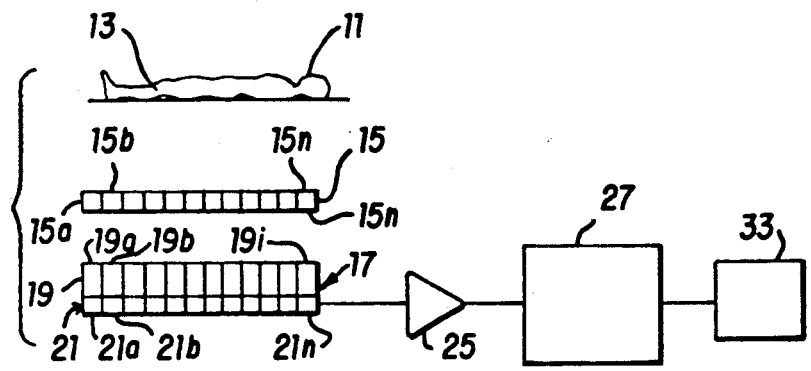
FIGS. 1 and 2 are schematic block diagrams of a gamma ray imaging system in accordance with an embodiment of the invention.

Referring to FIG. 1, a body such as that of a human patient 11 has implanted therein a source 13 of gamma radiation which exits the body and enters a collimator 15. Collimator 15 is of any suitable well known design and has holes or slits therein which enable the gamma radiation to pass through the collimator in a desired manner, described below, toward a two dimensional detector array or matrix 17.

The detector array or matrix 17 is preferably rectangular or square and is composed of a relatively large number of detector elements or pixels, e.g., 256 pixels on each side of a square array. For purposes of illustration, one row of the array 17 is shown in FIG. 1 identified by the reference numeral 19 having pixels 19$a$, 19$b$, ... 19$n$. The surface area of each pixel 19$a$, etc., facing the collimator is about 1 square millimeter with a distance of about 0.2 mm between each pixel. Each pixel is preferably square in cross section but may have other cross sectional shapes as well.

Each of the pixels 19$a$, etc. is preferably fabricated of semiconductor material having a high atomic number i.e., exceeding 30, such as HgI$_2$ or CdTe in passivated form. Mixtures of p type materials such as HgCdTe with implanted ions may also be used. Also, GaAs and PbS are suitable. Pure Ge may be used but must have a long dimension in the direction of the incoming radiation in order to have comparable detection efficiencies. Ge can provide the best energy resolution of any of the other materials. Each of the pixels may be constructed in any suitable well known manner such as, for example, as shown in aforementioned U.S. Pat. No. 4,571,494. The preferred axial length of each pixel may be from about 0.5 to about 2.0 mm, although the exact length is not critical. For Ge, a length of about 10 mm may be used. The cross sectional area of each pixel is about 1 square mm.

The desired manner by which the gamma radiation is to pass through the collimator 15 is achieved by providing a plurality of holes or slots 15$a$, 15$b$, ... 15$n$ preferably having the same cross sectional shape and dimensions as those of the pixels 19$a$, 19$b$, ... 19$n$. The collimator is preferably fabricated of Pb having a square hole pattern (if the pixels are square in cross section)

with center to center distance of about 1.2 mm. This corresponds to pixel cross sectional areas of 1 square mm with a wall thickness or distance between adjacent edges of pixels of about 0.2 mm. As indicated in FIG. 1, each of the holes or slots of the collimator 15 is aligned to have its bore parallel to the axis of each pixel so that the gamma radiation is constrained by the collimator to impinge on each pixel in a direction parallel to the axis of the pixel.

A CCD or other multiplexer 21 of any suitable well known design is coupled to the pixels in each of the rows 19a, etc., of the array 17 in any appropriate well known manner so that electron charges accumulated in each pixel due to the photoelectric action of the gamma radiation are fed to its own respective CCD 21a, 21b, . . . 21n for readout. The readout is conducted row-by-row in parallel as further shown in FIG. 2 wherein a plurality of rows 19-1, 19-2, . . . 19-i of pixels in the array 17 is illustrated. Each CCD device records the total charge detected in each element of the array, and the charge is collected and shifted by the multiplexer 21 to a buffer or any other suitable well-known storage device 23-1, 23-2, 23-n at the end of each row and thence to comparators 27-1, 27-2, . . . 27-i in each row.

The clock cycle or rate of the CCD multiplexer—the rate at which a charge is shifted from one location to the next and ultimately to the buffer—must be sufficiently fast so that the probability of having two photons enter one pixel during a clock cycle is small. The clock cycle may be about 1 megahertz—a period of 1 microsecond. Fortuitously, the flux of photons in nuclear medicine applications is sufficiently low thereby enabling this criterion to be satisfied. Thus, in accordance with the invention the total amount of charge collected in each CCD will normally be proportional to the energy of a photon.

Figure 3A:
FIGS. 3a, 3b, 3c, and 3d are waveform diagrams.

The charges collected by the CCDs in each row and multiplexed into the buffers are amplified in a linear amplifier 25 of any suitable well known design and fed to a comparator or threshold discriminator 27 of any suitable well known design. Referring to FIG. 3a, the pulses representing charge levels for each CCD in row 19-1 are fed to the comparator, followed as shown in graph of FIG. 3c by the pulses representing the charge levels for the CCDs in row 19-2, and so on.

The broken line 29 in the graphs a and c represents the threshold level which the charge levels must reach or surpass. This level is selected to be above the charge or energy level corresponding to any Compton scattering and is thus approximately slightly below the charge level associated with the energy of a photoelectric event—with a full photon. The variation in charge level above and below the threshold level will normally be quite small because of the high clock pulse rate limiting the photon activity to a small range of variation, the bulk of which for Compton scattering will be from levels quite low to levels near the threshold level.

Figure 3B:
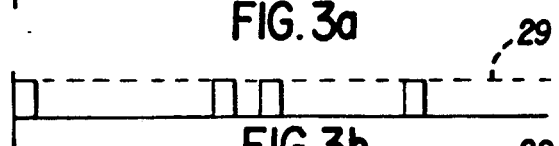

The comparator or threshold discriminator 27 eliminates those pulses or charge levels representing energy levels less than charge levels for photoelectric events, e.g., energies corresponding to Compton scattering or other lower energy levels. Consequently, for the ten illustrated CCD charge levels or pulses in graph a for row 19-1 inputted to comparator, as shown in graph of FIG. 3b, only pulses corresponding to the first, fifth, sixth, and ninth input pulses which exceeded the threshold level 29 are produced as outputs by the comparator.

Figure 3E:
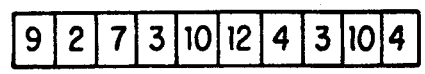
FIGS. 3e and 3f are pulse count graphs or diagrams, for explaining the embodiments of FIGS. 1 and 2.
Figure 3C:
Figure 3D:
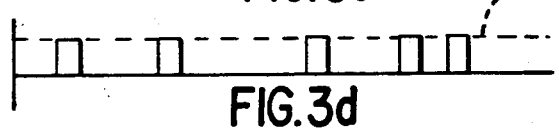

In a manner similar to row 19-1, only the charge levels for row 19-2, graph of FIG. 3c, of the array 17 exceeding the threshold level 29 are passed to output by the comparator 27. Thus, in row 19-2, as shown in graph of FIG. 3d, only the second, fourth, seventh, ninth, and tenth charge levels or pulses are outputted.

With each successive readout of the charge levels for each row, the comparator 27 provides a digital count of the photoelectric energy related charge levels corresponding to each CCD of the row.

In accordance with the invention, successive readouts are taken over a short period which may range from about 10 seconds to about 10 minutes or more, depending on materials. The several rows of the array 17 are preferably read out in parallel at the end of each clock cycle. This may be accomplished by a signal processor or computer 31 of any suitable well known design. Thus, if the array 17 has 256 rows and the clock period is 1 microsecond, the rows can be cycled for readout approximately every 256 microseconds. Thus, over a readout period of, say, four or five minutes, much image information can be collected.

Figure 3F:
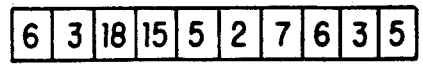

The cumulative readout of the comparator in terms of the counts for charge levels over a period of a few minutes is illustrated in the graph of FIG. 3e for the row 19-1 and graph of FIG. 3f for the row 19-2 of array 17. The lower the number representing counted photoelectric events for each CCD, the lighter the image. Consequently, it is seen that this arrangement in accordance with the invention ensures that only full energy, non-scattered photons are used in reconstructing the image of the body 11.

Figure 2:
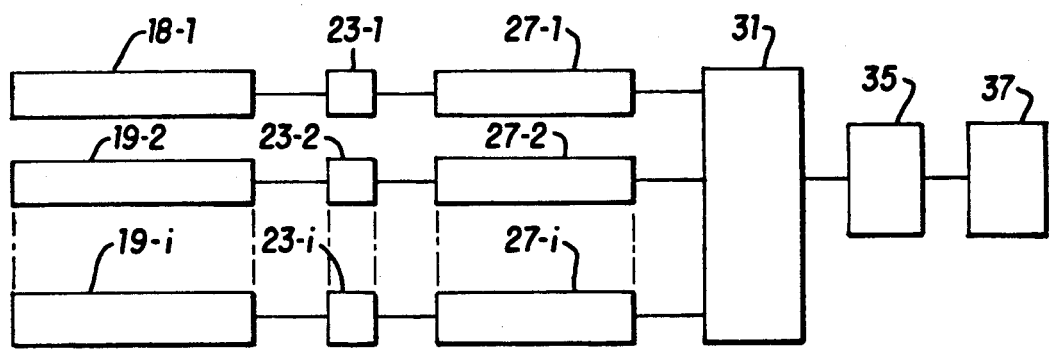

As further shown in FIG. 1, the outputs of comparator 27 may be stored in a memory 33. As shown in FIG. 2, the outputs of the several comparators corresponding to each row of the array may be fed to the signal processor 31 which may incorporate a memory section and then be fed to a CRT 35 for display and a printer 37 in any suitable well known manner.

Figure 4:
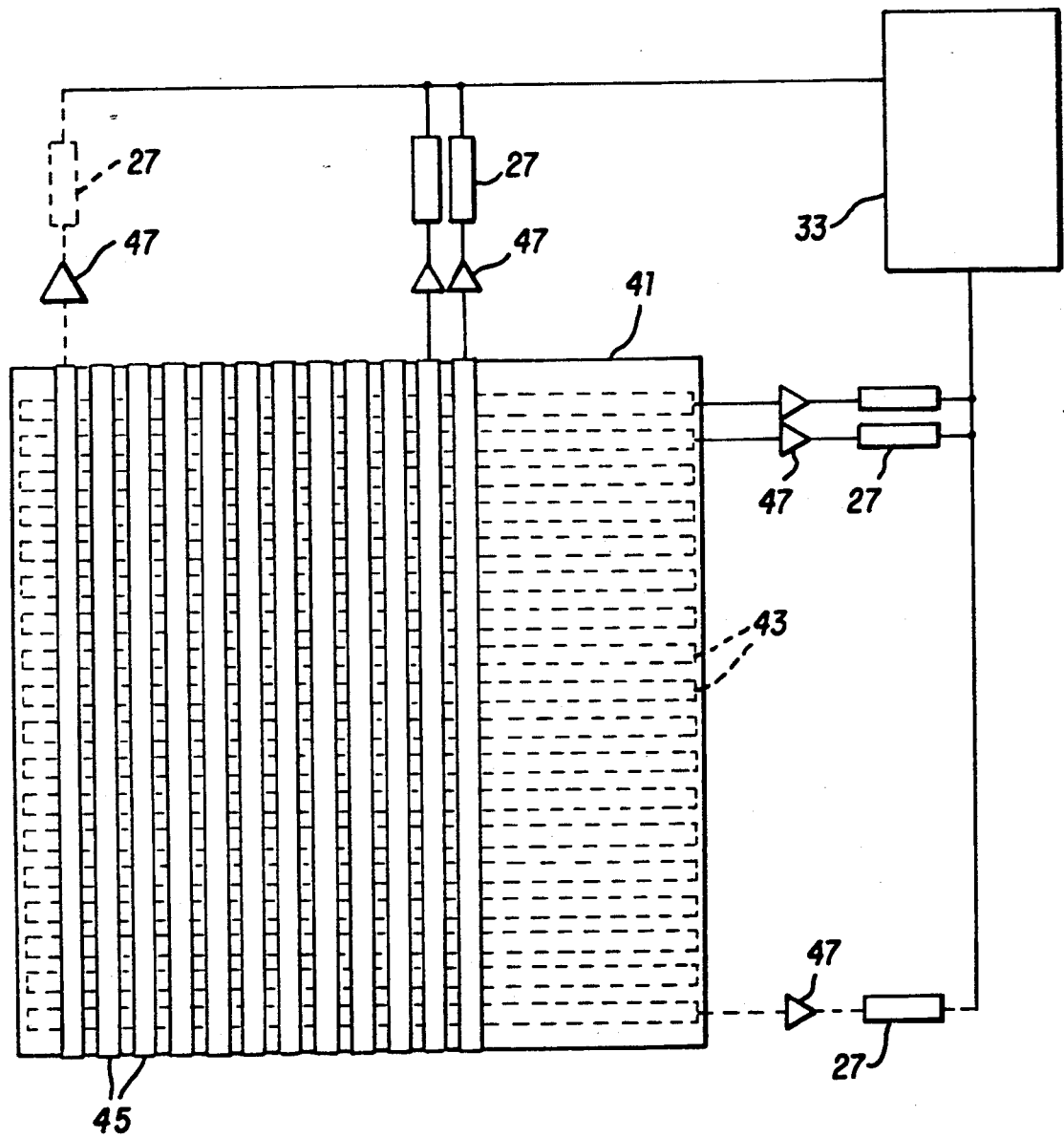
FIG. 4 is a schematic diagram of a gamma ray imaging system in accordance with another embodiment of the present invention.

In accordance with another embodiment of the present invention, as shown in FIG. 4, instead of the semiconductor array or matrix 17 employing discrete pixels as previously described in connection with FIGS. 1--3a-f there may be provided a semiconductor matrix 41 comprised of a first plurality of horizontal or x-axis semiconductor strip detectors 43 and a second plurality of vertical or y-axis semiconductor strip detectors 45 overlying the strips 43. The strips may, be made of germanium or any other suitable semiconductor material. Each strip is about 1 mm wide and separated by a distance of 0.2 mm, thus providing at each intersection of the horizontal and vertical strips a cross point of about 1 square millimeter. The strips may be fabricated in any suitable well known manner, such as, for example, in the manner described by D. Gutknecht in Nuclear Instruments and Methods in Physics Research, Vol. A288 (1990), pp 13-18.

In connection with the matrix shown in FIG. 4, a CCD or other multiplexer is not necessary. An amplifier 47 and a comparator 27 of any suitable well known construction may be used for each vertical and each horizontal strip as indicated in FIG. 4, the total number of electronic processing paths or channels for the matrix 41 being equal to the number of horizontal plus the number of vertical strips.

In operation, for each period of exposure of the matrix 41 to a radiation pattern representing the image, a pulse or voltage will exist or not exist in certain of the horizontal and vertical strips. The pulse output from each horizontal and vertical strip may be fed to its preamplifier 47 of any suitable well known construction and thence to a comparator 27 as described in connection with FIGS. 1-3a-f. In order to meet the energy threshold requirements as previously described in connection with FIGS. 3a-f, the pulse would have to exceed the value represented by the broken line 29 in FIG. 3a-d. The signal from each comparator 27 is then fed to a signal processor or data processor 33 of any suitable well known construction for processing and printout or display.

Although the method and apparatus of this invention has been described with reference to a human body, it can be applied to any object through which radiation passes or which generates radiation. For example, the invention can be applied to the detection of radiation leaks through defective welds.

We claim:

1. The method of providing selected image signals of a body through which gamma radiation from a source is passed, comprising the steps of:
   a. detecting, within each fixed time period of a succession of fixed time periods at a plurality of locations impinged by the gamma radiation, electric charge levels corresponding to the energy level of the gamma radiation to be imaged, said electric charge levels thus being sufficient to cause a detectable response;
   b. counting within each fixed time period from among the charge levels sufficient to cause a detectable response only those electric charge levels at each location which exceed a predetermined threshold level, said predetermined threshold level being approximately equal to the charge level of a photoelectric event which corresponds to an energy level at least higher than the energy level associated with Compton scattering, and
   c. adding the counted electric charges for the succession of fixed time periods to provide selected signals representing an image of the body;
   wherein uncounted charge levels and thus unwanted image signals are eliminated if they do not reach the threshold level within one of said fixed time periods.

2. The method of claim 1 wherein the source of gamma radiation is located within the body.

3. The method of claim 2 wherein the body is that of a human.

4. The method of claim 1 wherein the direction from which each location is impinged by the gamma radiation is essentially normal to the plane described by each location and the location immediately adjacent thereto.

5. The method of claim 1 wherein the locations are arranged in a multiplicity of rows and columns forming a two dimensional matrix.

6. Apparatus for providing selected image signals of a body through which gamma radiation from a source is passed, comprising:
   a. means for detecting, within each fixed time period over a succession of fixed time periods at a plurality of locations impinged by gamma radiation, electric charge levels corresponding to the energy level of the gamma radiation to be imaged;
   b. means for counting within each fixed time period from among the charge levels sufficient to cause a detectable response only those electric charge levels which exceed a predetermined threshold level, said predetermined threshold level being approximately equal to the charge level of a photoelectric even corresponding to an energy level at least higher than the energy level associated with Compton scattering, and
   c. means for adding the counted charge levels for the succession of fixed time periods to provide selected signals representing an image of the body, whereby uncounted charge levels and thus unwanted image signals are eliminated if they do not reach the threshold level within one of said fixed time periods.

7. Apparatus as in claim 6 wherein said means for detecting comprises at each location a pixel of semiconductor material, said pixels being arranged in a multiplicity of rows and columns to form a two dimensional matrix.

8. Apparatus as in claim 7 wherein said means for detecting further comprises means for collimating the gamma radiation so that it impinges each pixel from a direction essentially normal to the plane described by the pixel and at least one immediately adjacent pixel in the matrix.

9. Apparatus as in claim 8 further comprising:
   d. means for processing as signals the counted charge levels for the duration of the succession of fixed time periods to provide the basis for constructing an image of the body.

10. Apparatus as in claim 9 wherein the duration of the succession of fixed time periods is within the range of from approximately 10 seconds to approximately 10 minutes.

11. Apparatus as in claim 10 wherein the semiconductor material in each pixel has an atomic number exceeding 30.

12. Apparatus as in claim 8 wherein the semiconductor material in each pixel comprises a material selected from the group of materials including $HgI_2$, CdTe in passivated form, HgCdTe with implanted ions, GaAs, PbS, and pure Ge.

* * * * *